(12) United States Patent
Ikeda

(10) Patent No.: US 9,651,437 B2
(45) Date of Patent: May 16, 2017

(54) TORQUE STEERING ANGLE SENSOR

(71) Applicant: Hitachi Metals, Ltd., Tokyo (JP)

(72) Inventor: Yukio Ikeda, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 13 days.

(21) Appl. No.: 14/924,359

(22) Filed: Oct. 27, 2015

(65) Prior Publication Data
US 2016/0138983 A1 May 19, 2016

(30) Foreign Application Priority Data

Nov. 19, 2014 (JP) .................................. 2014-234226

(51) Int. Cl.
*B62D 6/10* (2006.01)
*G01L 3/10* (2006.01)
*B62D 15/02* (2006.01)

(52) U.S. Cl.
CPC ............... *G01L 3/101* (2013.01); *B62D 6/10* (2013.01); *B62D 15/0215* (2013.01)

(58) Field of Classification Search
CPC ........ G01L 3/101; B62D 6/10; B62D 15/0215
See application file for complete search history.

(56) References Cited

U.S. PATENT DOCUMENTS

| | | | | |
|---|---|---|---|---|
| 4,437,531 A * | 3/1984 | Urabe | ...................... | B62D 6/10 180/446 |
| 6,331,772 B1 * | 12/2001 | Windte | ..................... | G01D 5/14 324/207.15 |
| 6,363,797 B1 * | 4/2002 | Tokumoto | ............... | G01L 3/101 73/862.328 |
| 6,370,966 B1 * | 4/2002 | Naruse | ..................... | B62D 6/10 73/862.08 |
| 6,543,571 B2 * | 4/2003 | Tokumoto | ............ | B62D 5/0472 180/443 |
| 6,691,820 B2 * | 2/2004 | Tokumoto | ............ | B62D 5/0472 180/443 |
| 6,733,025 B2 * | 5/2004 | Su | ............................ | B62H 1/02 180/219 |

(Continued)

FOREIGN PATENT DOCUMENTS

JP 2010-190632 A 9/2010

*Primary Examiner* — Harshad R Patel
*Assistant Examiner* — Tran M Tran
(74) *Attorney, Agent, or Firm* — McGinn IP Law Group, PLLC

(57) ABSTRACT

A torque steering angle sensor is provided. The sensor includes a ring magnet with magnetic poles, magnetic path forming members to vary in location relative to the magnetic poles depending on torsion of a torsion bar, one pair of magnetic flux collecting rings for the magnetic path forming members, a first detecting element to detect a magnetic field between the flux collecting rings, a second detecting element to receive a magnetic field from the ring magnet, a slide magnet for producing a magnetic field in a different direction from that of the magnetic field of the ring magnet in the second detecting element, and a sliding mechanism to move the slide magnet toward or apart from the second detecting element with rotation of a rotary member of an electrically assisted power steering device. The second detecting element detects the magnetic fields received from the ring magnet and the slide magnet.

10 Claims, 9 Drawing Sheets

(56) References Cited

U.S. PATENT DOCUMENTS

| | | | |
|---|---|---|---|
| 6,810,754 B2 * | 11/2004 | May | G01D 5/14 73/862.333 |
| 6,926,115 B2 * | 8/2005 | Masaki | B62D 6/10 180/443 |
| 7,174,795 B2 * | 2/2007 | Feng | G01D 5/145 73/862.331 |
| 7,197,946 B2 * | 4/2007 | Flammer | G01M 3/22 73/862.331 |
| 7,275,619 B2 * | 10/2007 | Tokumoto | B62D 5/0484 180/446 |
| 7,363,825 B2 * | 4/2008 | Feng | G01L 3/104 73/862.325 |
| 7,639,004 B2 * | 12/2009 | Islam | G01D 5/145 324/207.2 |
| 8,047,084 B2 * | 11/2011 | Okuyama | G01D 1/00 324/207.2 |
| 8,087,305 B2 * | 1/2012 | Eggimann | G01D 5/145 73/862.333 |
| 8,528,422 B2 * | 9/2013 | Sanada | B62D 6/10 73/862.335 |
| 8,534,141 B2 * | 9/2013 | Maehara | B62D 6/10 73/862.333 |
| 8,607,650 B2 * | 12/2013 | Antoni | G01D 5/2451 73/760 |
| 8,749,229 B2 * | 6/2014 | Naganuma | G01R 33/0011 324/207.25 |
| 8,776,619 B2 * | 7/2014 | Jammer | G01L 3/102 73/862.333 |
| 8,943,879 B2 * | 2/2015 | Kang | B62D 6/10 73/117.02 |
| 9,329,019 B2 * | 5/2016 | Reymann | G01D 5/2515 |
| 2004/0016305 A1 * | 1/2004 | Matsumoto | G01L 5/221 73/862.331 |
| 2009/0027045 A1 * | 1/2009 | Islam | G01L 3/104 324/207.13 |
| 2011/0303001 A1 * | 12/2011 | Hirose | G01L 5/221 73/117.02 |
| 2015/0362388 A1 * | 12/2015 | Schmid | G01L 3/109 73/862.333 |

* cited by examiner

TORQUE STEERING ANGLE SENSOR

The present application is based on Japanese patent application No. 2014-234226 filed on Nov. 19, 2014, the entire contents of which are incorporated herein by reference.

BACKGROUND OF THE INVENTION

1. Field of the Invention

This invention relates to a torque steering angle sensor, which is capable of detecting a steering torque and a steering angle of a steering wheel of a vehicle.

2. Description of the Related Art

Conventionally, electrically assisted power steering devices for vehicles are provided with a torque sensor to be able to detect a steering torque. Such a torque sensor is able to detect a steering angle as well as the steering torque. See, e.g. JP-A-2010-190632.

A torque sensor disclosed by JP-A-2010-190632 as a first embodiment includes a torsion bar for coupling together an input shaft and an output shaft of a steering shaft, a sensor yoke assembly, which is fixed to the input shaft of the steering shaft, a magnetic flux collecting yoke assembly to collect the magnetic flux of the sensor yoke assembly, an annular permanent magnet, which is rotated together with the output shaft of the steering shaft, a first magnetic field detector, which is disposed between a first magnetic flux collecting yoke constituting portion and a second magnetic flux collecting yoke constituting portion which constitute the magnetic flux collecting yoke assembly, and a second magnetic field detector, which is arranged opposite an outer circumferential surface of the permanent magnet.

The torque sensor is configured in such a manner that the steering torque is detectable from a variation in magnetic field strength detected by the first magnetic field detector depending on a torsional angle of the torsion bar. Also, a rotational angle between adjacent N and S poles is detectable from a variation in magnetic field strength detected by the second magnetic field detector resulting from rotation of the permanent magnet, and the steering angle can be computed by cumulating the rotational angles.

In addition, a torque sensor disclosed by JP-A-2010-190632 as a second embodiment, the outer circumferential surface of the permanent magnet is two pole parallel magnetized, so that the second magnetic field detector is able to detect a magnetic field direction. This allows for more easily computing the steered angle, as compared to the torque sensor in the first embodiment.

Further, a torque sensor disclosed by JP-A-2010-190632 as a third embodiment includes, in addition to each constituent element of the torque sensor of the first embodiment, a first gear, which is fixed to a lower surface of the permanent magnet, a second gear, which meshes with the first gear, a two-pole magnet, which is fixed to the second gear, and a third magnetic field detector, which is arranged opposite the two-pole magnet. The first gear and the second gear are both made of spur gears having different numbers of teeth. This torque sensor is able to detect an absolute value of the steering angle, in other words, an absolute angle, from a combination of a magnetic field strength detected by the second magnetic field detector and a magnetic field strength detected by the third magnetic field detector, even when the steering shaft is multi-rotated.

SUMMARY OF THE INVENTION

Because the torque sensors in the first and second embodiments of JP-A-2010-190632 are not configured to mechanically detect the absolute value of the steering angle, no accurate absolute angle can be determined, except after a neutral location of the steering wheel is detected by vehicle starting by ignition key operation and continuing to run straight for a predetermined time, for example. On the other hand, although the torque sensor in the third embodiment of JP-A-2010-190632 is able to mechanically detect the absolute value of the steering angle, the two magnetic field detectors (the second magnetic field detector and the third magnetic field detector) to detect the steering angle are used, therefore causing the cost to increase. Moreover, because the second gear meshes radially with the first gear fixed to the annular permanent magnet, the size of the torque sensor becomes large in a radial direction of the steering shaft.

Accordingly, it is an object of the present invention to provide a torque steering angle sensor, which is capable of mechanically detecting an absolute value of a steering angle as well as a steering torque, and suppressing an increase in cost and an increase in size.

According to an embodiment of the invention, a torque steering angle sensor, which is arranged on a coupling portion for a first rotary member and a second rotary member of an electrically assisted power steering device to be coupled together by a torsion bar having a torsional angle depending on a steering torque of a steering wheel, and which is configured to detect a steering angle and the steering torque of the steering wheel, comprises:

an annular ring magnet provided with a plurality of magnetic poles having different polarities in a circumferential direction around a rotational axis of the first rotary member and the second rotary member, the annular ring magnet being configured to rotate together with the first rotary member;

a plurality of magnetic path forming members to form magnetic paths for a magnetic flux of the ring magnet, the magnetic path forming members being configured to vary in location relative to the plurality of magnetic poles of the ring magnet, depending on torsion of the torsion bar;

one pair of magnetic flux collecting rings to collect the magnetic flux of the plurality of magnetic path forming members;

a first magnetic field detecting element to detect a magnetic field strength between the one pair of magnetic flux collecting rings;

a non-rotary member for being not rotated by rotation of the first rotary member;

a second magnetic field detecting element fixed to the non-rotary member, and located in such a manner as to receive a magnetic field from the ring magnet;

a slide magnet for producing a magnetic field in a different direction from that of the magnetic field of the ring magnet in the second magnetic field detecting element; and a sliding mechanism to move the slide magnet toward or apart from the second magnetic field detecting element with the rotation of the first rotary member, wherein the second magnetic field detecting element is configured to be able to detect a magnetic field strength received from the ring magnet, and a magnetic field strength received from the slide magnet.

In the embodiment, the following modifications and changes may be made.

(i) The second magnetic field detecting element is disposed opposite an outer circumferential surface of the ring magnet, so as to be able to detect magnetic field strengths in circumferential and radial directions of the ring magnet.

(ii) The sliding mechanism is configured to move the slide magnet parallel to the rotational axis.

(iii) The sliding mechanism includes:

a supporting member for supporting the slide magnet;

an annular member configured to rotate together with the first rotary member, and including a helical meshing portion formed around an outer circumferential surface in such a manner as to mesh with the supporting member; and a guiding member fixed to the non-rotary member so as to guide the supporting member parallel to the rotational axis.

(iv) The ring magnet is located apart from the one pair of magnetic flux collecting rings in a rotational axis direction, and the plurality of magnetic path forming members each include a respective opposite piece, which is located opposite and parallel to an axial end face of the ring magnet, a respective transmitting or receiving portion to transmit or receive the magnetic flux to or from one of the one pair of magnetic flux collecting rings, and a respective transferring portion to transfer the magnetic flux between the respective opposite piece and the respective transmitting or receiving portion.

(v) The one pair of magnetic flux collecting rings each include a respective annular portion, which is disposed coaxially with the ring magnet to transmit or receive the magnetic flux to or from the respective transmitting or receiving portions of the magnetic path forming members, and a respective opposite portion, which is located opposite the first magnetic field detecting element, wherein the annular portions are in an annular plate shape whose radial width is larger than its axial thickness, wherein the transmitting or receiving portions include a tip formed in a circular arc shape having a curvature having an inner radius of the annular portions, extend in a radial direction of the annular portions, and are in a plate shape having a thickness in an axial direction of the annular portions.

(vi) The one pair of magnetic flux collecting rings each include a respective annular portion, which is disposed coaxially with the ring magnet to transmit or receive the magnetic flux to or from the respective transmitting or receiving portions of the magnetic path forming members, and a respective opposite portion, which is located opposite the first magnetic field detecting element, wherein the annular portions are in a circular cylindrical shape whose axial width is larger than its radial thickness, wherein the transmitting or receiving portions are in a plate shape radially opposite respective inner circumferential surfaces of the annular portions.

(vii) The second magnetic field detecting element and the slide magnet are located closer to the rotational axis than respective radial outer edges of the respective annular portions of the one pair of magnetic flux collecting rings.

(viii) The first magnetic field detecting element and the second magnetic field detecting element are located with the rotational axis therebetween.

(ix) The ring magnet includes 4 or more magnetic poles.

(Points of the Invention)

The torque steering angle sensor according to the present invention allows for mechanically detecting the absolute value of the steering angle, and suppressing an increase in cost and an increase in size.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

First Embodiment

Below is described a first embodiment of the present invention with reference to FIGS. 1 to 8B.

Figure 1:
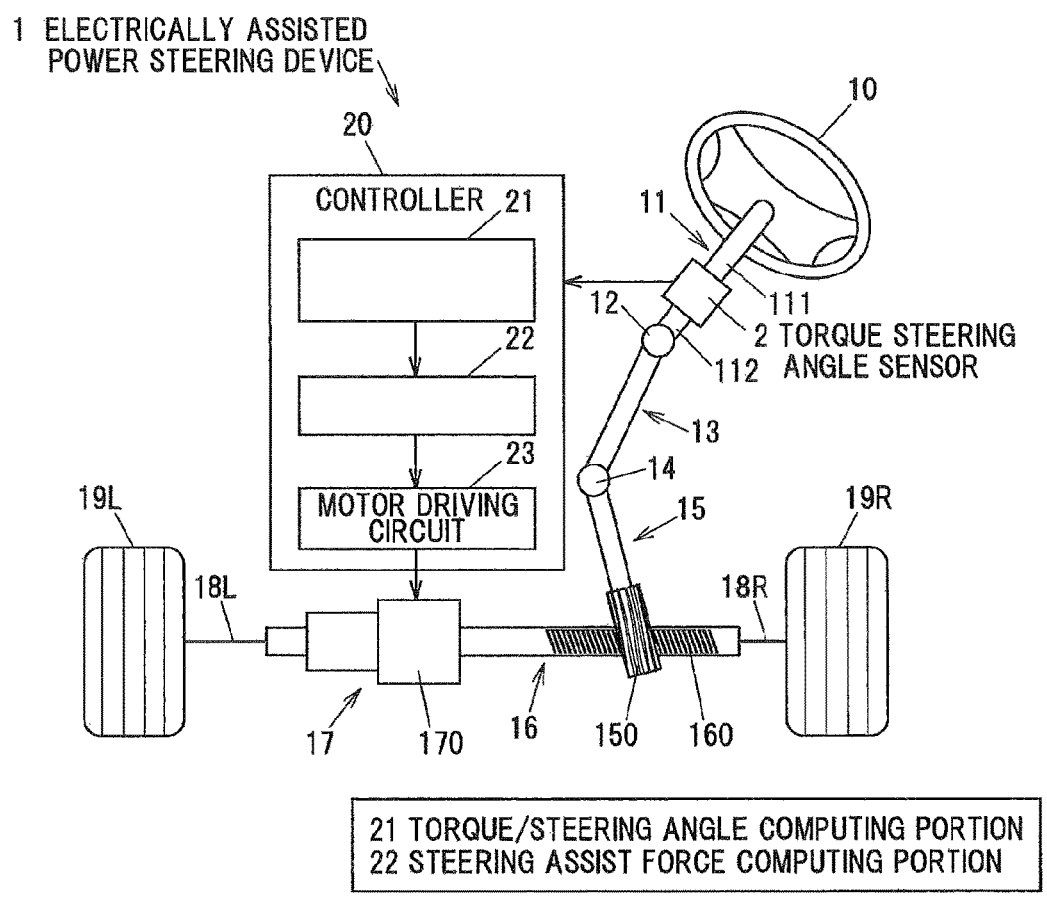
FIG. 1 is a schematic diagram showing an electrically assisted power steering device 1 to which a torque steering angle sensor in a first embodiment of the present invention is applied.

FIG. 1 is a schematic diagram showing an electrically assisted power steering device 1 to which a torque steering angle sensor in the first embodiment of the present invention is applied.

The electrically assisted power steering device 1 includes a steering shaft 11, which is connected to a steering wheel 10, an intermediate shaft 13, which is connected to the steering shaft 11 via a universal joint 12, a pinion shaft 15, which is connected to the intermediate shaft 13 via a universal joint 14, a rack shaft 16, which is provided with rack teeth 160 which mesh with pinion teeth 150 of the pinion shaft 15, a steering assist mechanism 17 to generate a steering assist force depending on a steering torque applied to the steering shaft 11 in steering of the steering wheel 10, and a torque steering angle sensor 2 to detect a steering angle and a steering torque of the steering wheel 10.

The rack shaft 16 is supported by a rack housing not shown, and is moved in a vehicle width direction depending on the steering of the steering wheel 10. Turning left and right front wheels 19L and 19R and the rack shaft 16 are connected together by left and right tie rods 18L, and 18R. The rack shaft 16 and the pinion shaft 15 constitute a rack and pinion steering mechanism.

In this embodiment, the steering assist mechanism 17 is of a rack assist type to apply a steering assist force to the rack shaft 16, wherein a turning force of an electric motor 170 is converted by, for example a ball screw mechanism, into a moving force in a linear direction, and is applied to the rack shaft 16 as a steering assist force. It should be noted, however, that the steering assist mechanism 17 may be of a column assist type to be provided in a steering column to support the steering shaft 11, wherein the turning force of the electric motor 170 is decelerated by, for example, a worm gear mechanism, and is applied to the steering shaft 11 as the steering assist force.

The steering assist mechanism 17 is provided with motor current from a controller 20 and produces a steering assist force depending on the motor current. The controller 20 includes a torque/steering angle computing portion 21 for computing a steering torque and a steering angle based on an output signal of the torque steering angle sensor 2, a steering assist force computing portion 22 for computing a steering assist force to be applied based on a computed result of the torque/steering angle computing portion 21, and a motor driving circuit 23 to output the motor current depending on the steering assist force computed by the steering assist force computing portion 22, and drive the electric motor 170 of the steering assist mechanism 17.

The steering assist force computing portion 22 is configured to perform the computation in such a manner that the greater the steering torque, or the higher the steering speed computed based on a temporal change in the steering angle, the greater the steering assist force applied to the steering mechanism by the steering assist mechanism 17. Further, the steering angle computed by the torque/steering angle computing portion 21 is also used for, for example, controlling in a vehicle anti-skid device (ESC: Electronic Stability Control) and the like.

The steering shaft 11 includes a first rotary member 111 on its steering wheel 10 side, and a second rotary member 112 on its intermediate shaft 13 side, a and the first rotary member 111 and the second rotary member 112 are coupled together by a torsion bar described later. The torque steering angle sensor 2 is arranged on a coupling portion for the first rotary member 111 and the second rotary member 112. Note that, in the present embodiment, although the torque steering angle sensor 2 is arranged on the steering shaft 11, the torque steering angle sensor 2 may instead be arranged on the pinion shaft 15, for example.

(Configuration of the Torque Steering Angle Sensor)

Next, a configuration of the torque steering angle sensor 2 will be described with reference to FIGS. 2 to 6. Note that, in the following description, although for convenience, the steering wheel 10 side in the axial direction of the steering shaft 11 is described as "upper," and its opposite side (the intermediate shaft 13 side) is described as "lower," the "upper" or "lower" is not intended to limit the upper or lower side in a vertical direction when the electrically assisted power steering device 1 is used.

Figure 2:
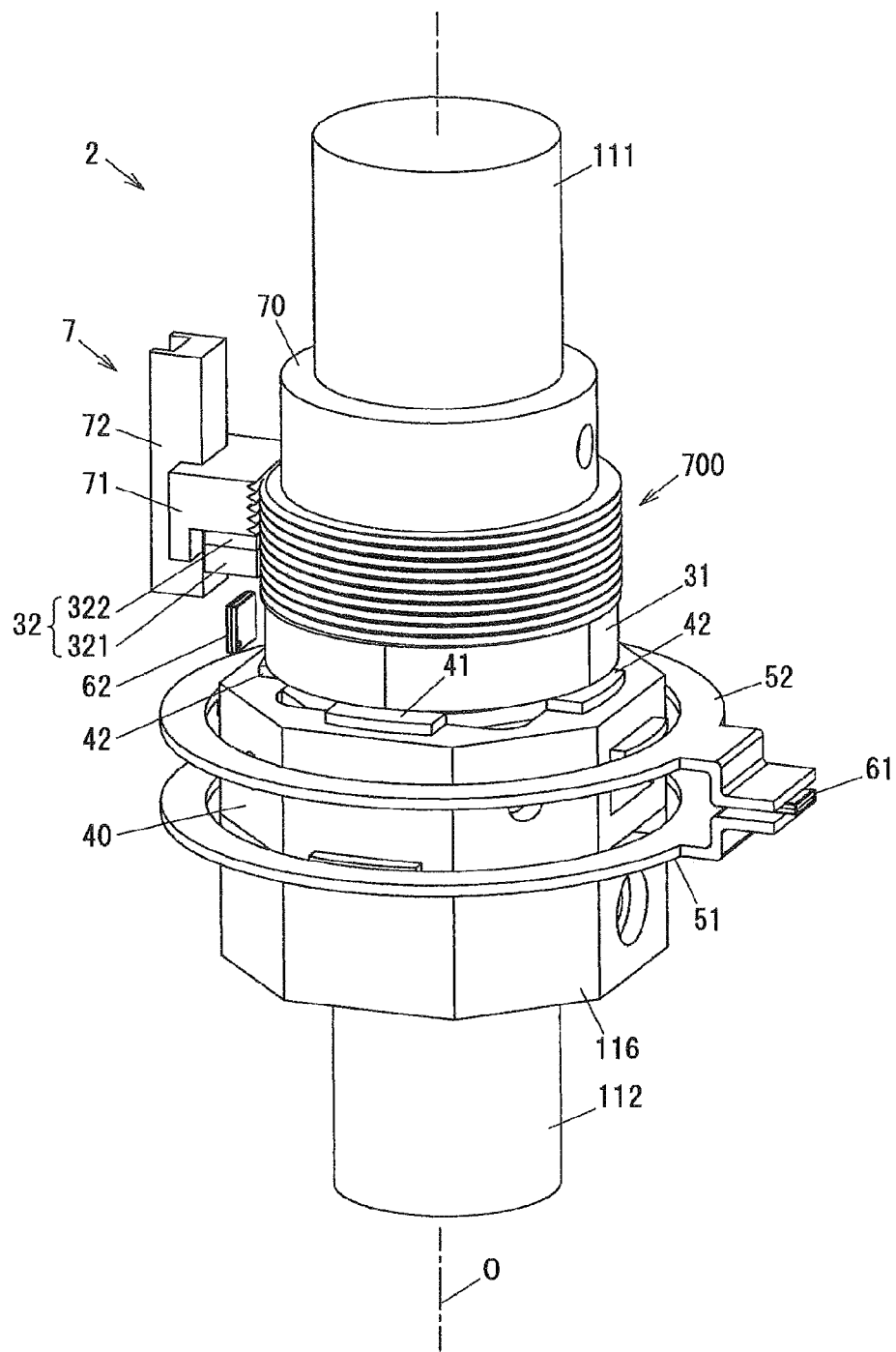
FIG. 2 is a perspective view showing an appearance of the torque steering angle sensor.
Figure 3:
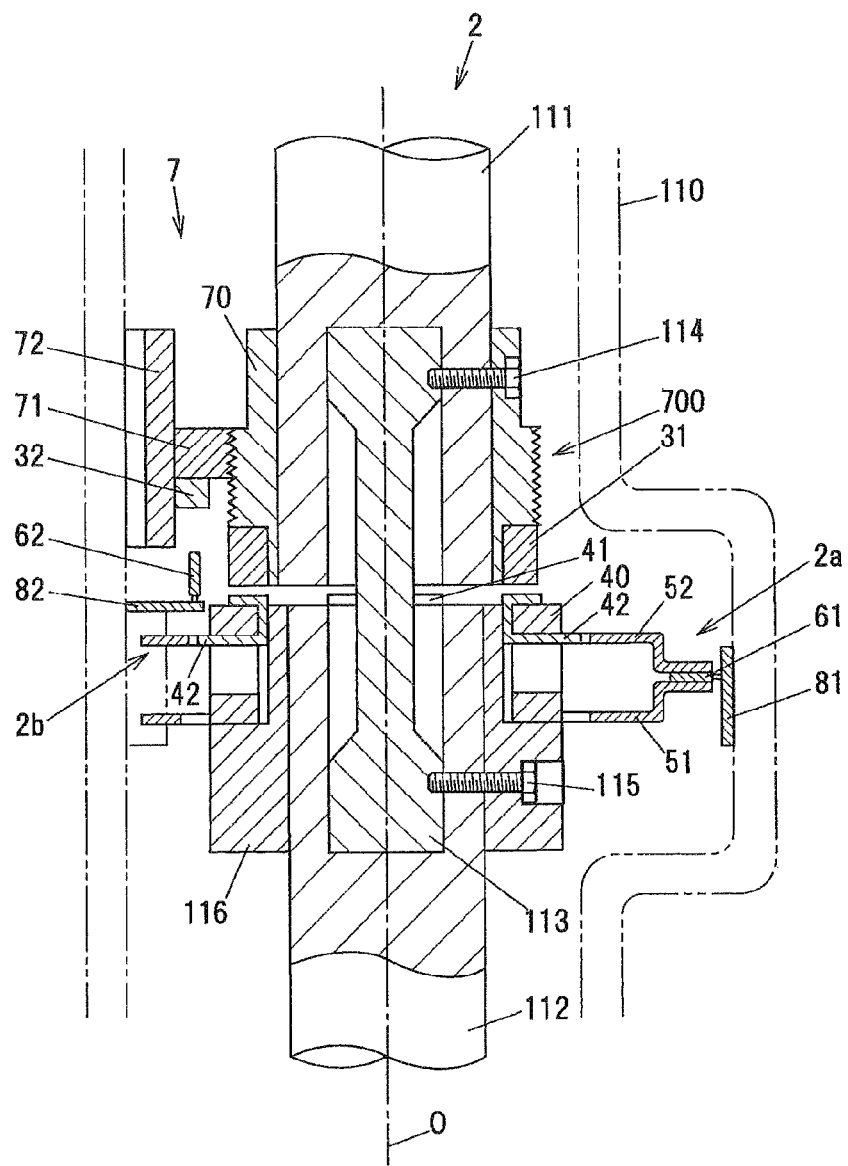
FIG. 3 is a cross sectional view taken along a rotational axis O of a steering shaft showing the torque steering angle sensor.
Figure 4A:
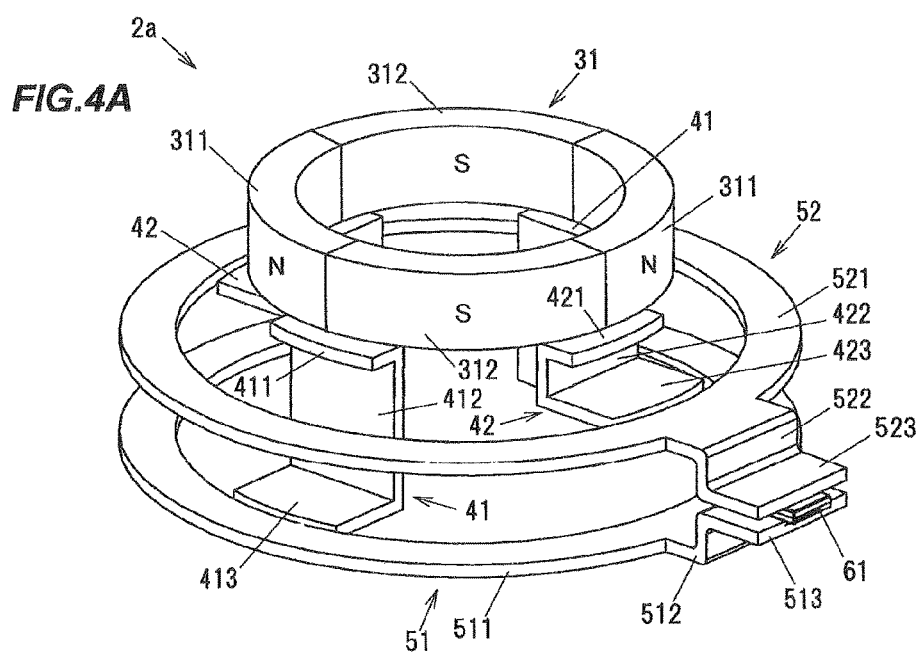
FIG. 4A is a perspective view showing a configuration of a torque detecting portion to detect a steering torque.
Figure 4B:
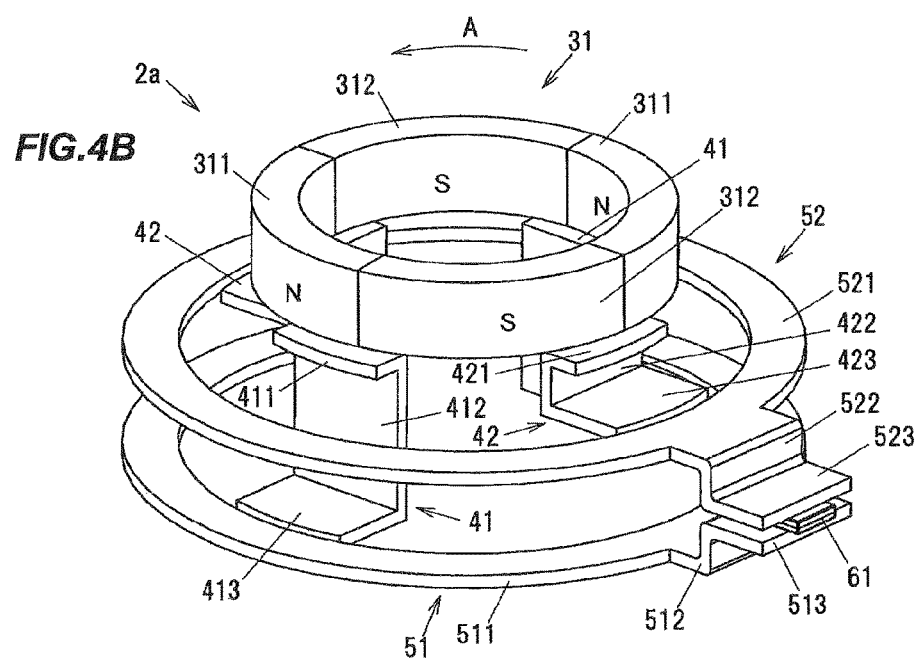
FIG. 4B is a perspective view showing a configuration of the torque detecting portion to detect a steering torque.
Figure 5:
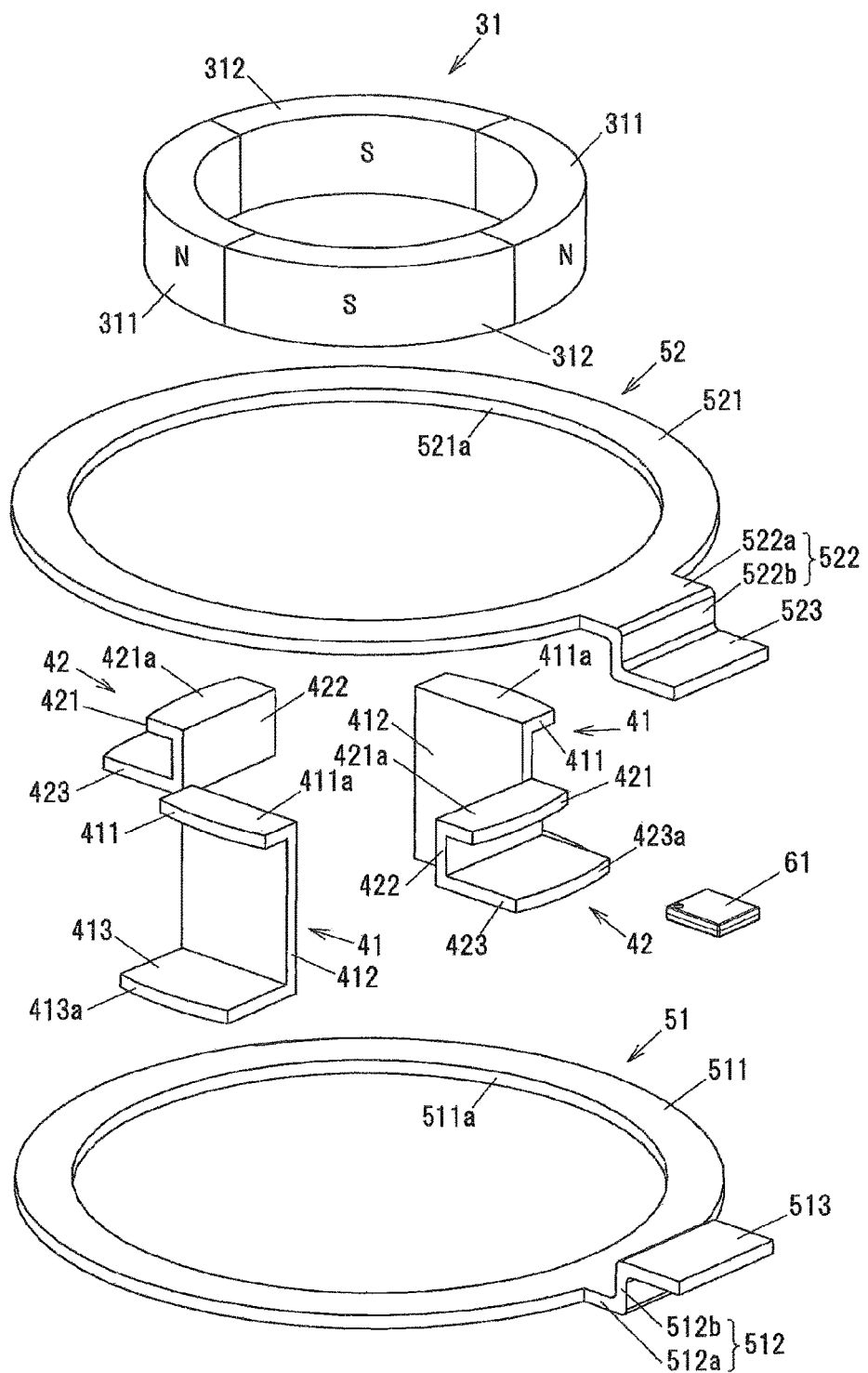
FIG. 5 is an exploded perspective view showing the torque detecting portion.
Figure 6:
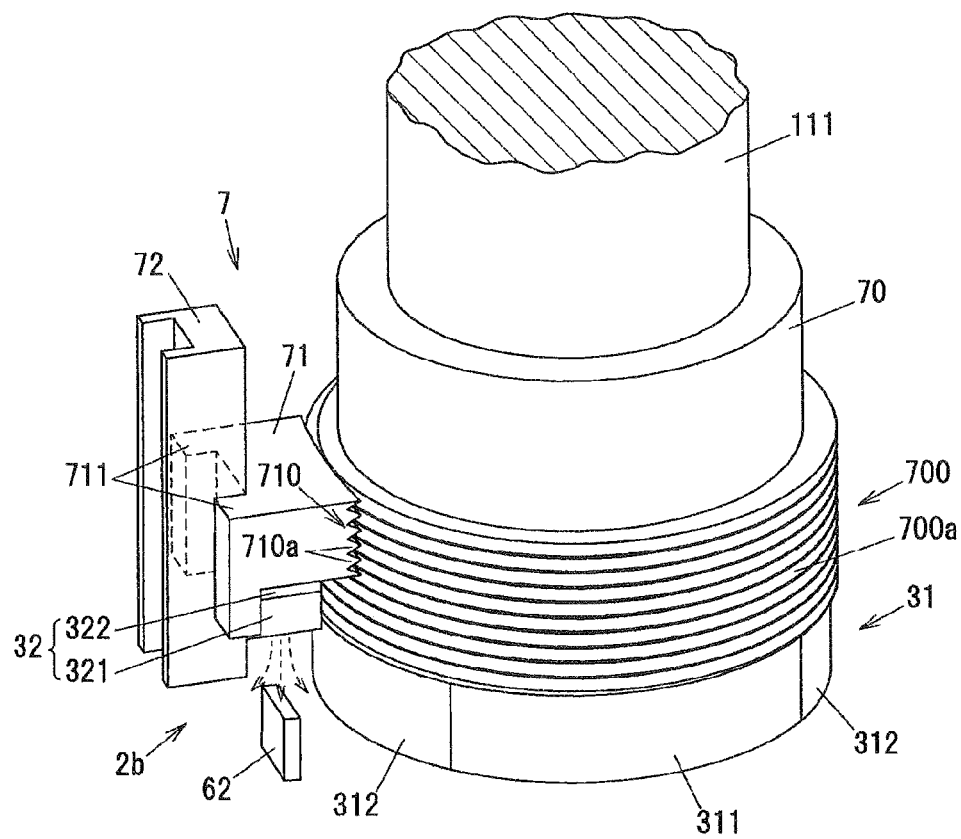
FIG. 6 is a perspective view showing a configuration of a steering angle detecting portion to detect a steering angle.

FIG. 2 is a perspective view showing an appearance of the torque steering angle sensor 2. FIG. 3 is a cross sectional view taken along a rotational axis O of the steering shaft 11 showing the torque steering angle sensor 2. FIGS. 4A and 4B are perspective views showing a configuration of a torque detecting portion 2a configured to detect a steering torque. FIG. 5 is an exploded perspective view showing the torque detecting portion 2a. FIG. 6 is a perspective view showing a configuration of a steering angle detecting portion 2b configured to detect a steering angle.

The first rotary member 111 and the second rotary member 112 of the steering shaft 11 share the rotational axis O, and rotate together with the steering wheel 10. As shown in FIG. 3, the first rotary member 111 and the second rotary member 112 are coupled together by a torsion bar 113 having a torsional angle depending on the steering torque of the steering wheel 10. The torsion bar 113 is unrotatably connected to the first rotary member 111 at one axial end thereof, and is unrotatably connected to the second rotary member 112 at the other axial end. In this embodiment, the torsion bar 113 is fixed to the first rotary member 111 at its upper end by a bolt 114, and is fixed to the second rotary member 112 at its lower end by a bolt 115.

The torque steering angle sensor 2 includes the torque detecting portion 2a configured to detect a steering torque, and the steering angle detecting portion 2b configured to detect a steering angle, and is received in a column housing 110 for tilt adjustably holding the steering shaft 11. In FIG. 3, the column housing 110 is indicated by a two-dot chain line. The column housing 110 and first and second substrates 81 and 82, which are fixed to the column housing 110, are examples of a "non-rotary member" in the present invention which is not rotated by the rotation of the first rotary member 111.

The torque steering angle sensor 2 includes an annular ring magnet 31, which is rotated together with the first rotary member 111, first magnetic yokes 41 and second magnetic yokes 42, which are configured as a plurality of magnetic path forming members to form magnetic paths for a magnetic flux of the ring magnet 31, a holding member 40 for holding the first magnetic yokes 41 and the second magnetic yokes 42, a circular cylindrical fixing member 116 for fixing the holding member 40 to the second rotary member 112, first and second magnetic flux collecting rings 51 and 52 to collect the magnetic flux of the first magnetic yokes 41 and the second magnetic yokes 42, a first magnetic field detecting element 61, which is arranged on and fixed to the first substrate 81, to detect a magnetic field strength between the first and second magnetic flux collecting rings 51 and 52, a second magnetic field detecting element 62, which is arranged on and fixed to the second substrate 82, and located in such a manner as to receive a magnetic field from the ring magnet 31, a slide magnet 32 for producing a magnetic field in a different direction from that of the magnetic field of the ring magnet 31 in the second magnetic field detecting element 62, and a sliding mechanism 7 to move the slide magnet 32 toward or apart from the second magnetic field detecting element 62 with the rotation of the first rotary member 111.

As shown in FIGS. 4A, 4B and 5, the ring magnet 31 is provided with a plurality of different magnetic poles having different polarities in a circumferential direction around the rotational axis O. In this embodiment, the ring magnet 31 is provided with the four magnetic poles composed of two N poles 311 and two S poles 312. As shown in FIG. 2, the slide magnet 32 is provided with an N pole 321 on its second magnetic field detecting element 62 side, and is provided with an S pole 322 on its opposite side. The sliding mechanism 7 is configured to move the slide magnet 32 parallel to the rotational axis O.

The first magnetic field detecting element 61 is mounted on the first substrate 81, while the second magnetic field detecting element 62 is mounted on the second substrate 82. The first and second magnetic field detecting element 61 and 62 are, for example Hall ICs, which use the Hall effect to detect the magnetic field strength. The first substrate 81 and the second substrate 82 are fixed to the column housing 110, and output signals of the first and second magnetic field detecting elements 61 and 62 are sent to the torque/steering angle computing portion 21 of the controller 20 via wiring patterns formed on surfaces of the first substrate 81 and the second substrate 82.

The second magnetic field detecting element 62 is arranged opposite an outer circumferential surface of the ring magnet 31, so as to be able to detect a magnetic field in a circumferential direction of the ring magnet 31, and a magnetic field in a radial direction of the magnetic field of the ring magnet 31, and moreover able to detect a magnetic field in a direction (parallel to the rotational axis O) at right angles to the circumferential direction and the radial direction of the ring magnet 31. In the following description, a first detection direction of the second magnetic field detecting element 62 in the circumferential direction of the ring magnet 31 is an X direction, a second detection direction of the second magnetic field detecting element 62 in the radial direction of the ring magnet 31 is a Y direction, and a third detection direction of the second magnetic field detecting element 62 at right angles to the X direction and the Y direction is a Z direction. That is, the second magnetic field detecting element 62 is able to detect the magnetic field strengths in the three directions (i.e., the X direction, the Y direction and the Z direction) respectively at right angles to each other.

Then, since the second magnetic field detecting element 62 is able to detect the magnetic fields in the X direction and the Y direction, it is able to detect the directions of the magnetic fields received from the ring magnet 31. Further, since the second magnetic field detecting element 62 is also able to detect the magnetic field in the Z direction parallel to the rotational axis O, it is able to detect the strength of the magnetic field received from the slide magnet 32.

The slide magnet 32 has its magnetization direction parallel to the rotational axis O, and its N pole 321 is located opposite the second magnetic field detecting element 62 in the Z direction. This allows for preventing the slide magnet 32 from producing its magnetic field in the X direction and the Y direction in the second magnetic field detecting element 62.

As shown in FIGS. 2 and 3, the first magnetic field detecting element 61 and the second magnetic field detecting elements 62 are located with the rotational axis O therebetween. That is, between the first magnetic field detecting element 61 and the second magnetic field detecting element 62 is arranged the steering shaft 11. This allows for suppressing the magnetic field of the slide magnet 32 arranged opposite the second magnetic field detecting element 62 from affecting results of the magnetic field strength detected by the first magnetic field detecting element 61.

The torque detecting portion 2a is composed of the ring magnet 31, the first magnetic yokes 41, the second magnetic yokes 42, the holding member 40, the first and second magnetic flux collecting rings 51 and 52, and the first magnetic field detecting element 61. The steering angle detecting portion 2b is composed of the ring magnet 31, the slide magnet 32, the sliding mechanism 7, and the second magnetic field detecting element 62. That is, the ring magnet 31 is the constituent element of both the torque detecting portion 2a and the steering angle detecting portion 2b. Respective configurations of the torque detecting portion 2a and the steering angle detecting portion 2b will be described in detail below.

(Configuration of the Torque Detecting Portion)

As shown in FIGS. 2 to 4A and 4B, the ring magnet 31 is located apart from the first and second magnetic flux collecting rings 51 and 52 in the rotational axis direction. More specifically, the second magnetic flux collecting ring 52 is disposed above the first magnetic flux collecting ring 51, and the ring magnet 31 is disposed above the second magnetic flux collecting ring 52. The first magnetic yokes 41 are configured to magnetically couple the ring magnet 31 and the first magnetic flux collecting ring 51 together, while the second magnetic yokes 42 are configured to magnetically couple the ring magnet 31 and the second magnetic flux collecting ring 52 together.

As described previously, the ring magnet 31 is rotated together with the first rotary member 111, and the first magnetic yokes 41 and the second magnetic yokes 42 are fixed to the second rotary member 112 via the holding member 40 and the fixing member 116. Therefore, when a steering torque is applied to the steering shaft 11 by the steering of the steering wheel 10 by a vehicle driver, a torsion occurs in the torsion bar 113, varying the relative locations between the magnetic poles of the ring magnet 31 and the first magnetic yokes 41 and the second magnetic yokes 42, depending on the resulting torsion.

FIG. 4A shows the torque detecting portion 2a with no torsion acting on the torsion bar 113 and FIG. 4B shows the torque detecting portion 2a with the torsion bar 113 being subjected to a torsion resulting from a steering torque. In this embodiment, the torque detecting portion 2a is provided with the two first magnetic yokes 41 and the two second magnetic yokes 42 disposed therein. With no torsion acting on the torsion bar 113, the two first magnetic yokes 41 and the two second magnetic yokes 42 are located opposite the boundaries between the N poles 311 and the S poles 312, respectively, of the ring magnet 31.

As shown in FIG. 5, the first magnetic yokes 41 each include a respective opposite piece 411, which is located opposite and parallel to an axial end face of the ring magnet 31, a respective transmitting or receiving portion 413 to transmit or receive the magnetic flux to or from the first magnetic flux collecting ring 51, and a respective transferring portion 412 to transfer the magnetic flux between the respective opposite piece 411 and the respective transmitting or receiving portion 413. The respective opposite piece 411 is in a flat plate shape including an opposite surface 411a, which is located opposite the N poles 311 of the ring magnet 31, and is extended outward in a radial direction of the ring magnet 31 at an upper end of the respective transferring portion 412. The respective transmitting or receiving portion 413 is extended outward in the radial direction of the ring magnet 31 at a lower end of the respective transferring portion 412. The respective transferring portion 412 is in a flat plate shape arranged parallel to the rotational axis O.

The second magnetic yokes 42 each include a respective opposite piece 421, which is located opposite and parallel to an axial end face of the ring magnet 31, a respective transmitting or receiving portion 423 to transmit or receive the magnetic flux to or from the first magnetic flux collecting ring 52, and a respective transferring portion 422 to transfer the magnetic flux between the respective opposite piece 421 and the respective transmitting or receiving portion 423. The respective opposite piece 421 is in a flat plate shape including an opposite surface 421a, which is located opposite the S poles 312 of the ring magnet 31, and is extended outward in the radial direction of the ring magnet 31 at an upper end of the respective transferring portion 422. The respective transmitting or receiving portion 423 is extended outward in the radial direction of the ring magnet 31 at a lower end of the respective transferring portion 422. The respective transferring portion 422 is in a flat plate shape arranged parallel to the rotational axis O.

The transferring portions 422 of the second magnetic yokes 42 are shorter in length parallel to the rotational axis O than the transferring portions 412 of the first magnetic yokes 41. This difference in length is based on the difference in vertical location between an annular portion 511 of the first magnetic flux collecting ring 51 and an annular portion 521 of the second magnetic flux collecting ring 52, as will be described below.

The first magnetic flux collecting ring 51 include an annular portion 511, which is disposed coaxially with the ring magnet 31 to transmit or receive the magnetic flux to or from the transmitting or receiving portions 413 of the first magnetic yokes 41, an opposite portion 513, which is located opposite the first magnetic field detecting element 61, and a connecting portion 512, which connects the annular portion 511 and the opposite portion 513 together. The connecting portion 512 is composed of a radial extending portion 512a, which is extended outward in a radial direction of the annular portion 511 at an outer circumferential surface portion of the annular portion 511, and an axial extending portion 512b, which is extended upward at a tip of the radial extending portion 512a. The opposite portion 513 is in a plate shape extending outward in the radial direction of the annular portion 511 at an upper end of the axial extending portion 512b.

The second magnetic flux collecting ring 52 include an annular portion 521, which is disposed coaxially with the ring magnet 31 to transmit or receive the magnetic flux to or from the transmitting or receiving portions 423 of the second magnetic yokes 42, an opposite portion 523, which is located opposite the first magnetic field detecting element 61, and a connecting portion 522, which connects the annular portion 521 and the opposite portion 523 together. The connecting portion 522 is composed of a radial extending portion 522a, which is extended outward in a radial direction of the annular portion 521 at an outer circumferential surface portion of the annular portion 521, and an axial extending portion 522b, which is extended downward at a tip of the radial extending portion 522a. The opposite portion 523 is in a plate shape extending from a lower end of the axial extending portion 522b outward in the radial direction of the annular portion 521.

The annular portion 511 of the first magnetic flux collecting ring 51 and the annular portion 521 of the second magnetic flux collecting ring 52 have their common inner and outer diameters, and are arranged vertically opposite and parallel to each other. Also, both these annular portions 511 and 521 are in an annular plate shape whose radial width is larger than its axial thickness. The first magnetic field detecting element 61 is disposed between the opposite portion 513 of the first magnetic flux collecting ring 51 and the opposite portion 523 of the second magnetic flux collecting ring 52, and is configured to detect a magnetic field strength between both the opposite portions 513 and 523.

The transmitting or receiving portions 413 of the first magnetic yokes 41 include their tip formed in a circular arc shape having a curvature having an inner radius of the annular portion 511 of the first magnetic flux collecting ring 51, extend in a radial direction of the annular portion 511, and are in a plate shape having a thickness in an axial direction of the annular portion 511. The transmitting or receiving portions 413 of the first magnetic yokes 41 include their tip surface 413a formed in such a manner as to be curved parallel to and opposite an inner circumferential surface 511a of the annular portion 511 of the first magnetic flux collecting ring 51.

Similarly, the transmitting or receiving portions 423 of the second magnetic yokes 42 include their tip formed in a circular arc shape having a curvature having an inner radius of the annular portion 521 of the second magnetic flux collecting ring 52, extend in a radial direction of the annular portion 521, and are in a plate shape having a thickness in an axial direction of the annular portion 521. The transmitting or receiving portions 423 of the second magnetic yokes 42 include their tip surface 423a formed in such a manner as to be curved parallel to and opposite an inner circumferential surface 521a of the annular portion 521 of the second magnetic flux collecting ring 52.

(Configuration of the Steering Angle Detecting Portion)

As shown in FIG. 6, the sliding mechanism 7 is configured as including a slider 71, which is configured as a supporting member for supporting the slide magnet 32, a slide driving member 70, which is configured as an annular member to be rotated together with the first rotary member 111, and which is provided with a helical meshing portion 700 around an outer circumferential surface in such a manner as to mesh with the slider 71, and a guiding member 72, which is fixed to the column housing 110 so as to guide the slider 71 parallel to the rotational axis O. The slide driving member 70, the slider 71, and the guiding member 72 are made of a non-magnetic metal such as aluminum, austenitic stainless steel or the like, or a non-magnetic material such as hard resin or the like.

The slide driving member 70 is in a circular cylindrical shape into which the first rotary member 111 is inserted, and is fixed to the first rotary member 111 at its upper end by the bolt 114 (shown in FIG. 3). The slide driving member 70 is fixed to the ring magnet 31 at its lower end by an adhesive, for example. The meshing portion 700 is formed in the middle in the axial direction of the slide driving member 70, and is configured to circumferentially partially mesh with the slider 71. The slide driving member 70 has its smaller outer diameter at its lower end formed than its outer diameter at its meshing portion 700, and is fitted with the ring magnet 31 around its outer circumferential surface at its lower end.

In this embodiment, the meshing portion 700 is in a male thread shape, and is provided with a single helical groove 700a around its outer circumferential surface. The helical groove 700a is configured to mesh with a multiplicity of protrusions 710a of the slider 71, so that when the slide driving member 70 is rotated together with the first rotary member 111, with the helical groove 700a and the multiplicity of protrusions 710a meshing with each other, the slider 71 is guided and moved vertically by the guiding member 72.

The slider 71 includes a meshing portion 710, which is provided with a multiplicity of protrusions 710a, and one pair of guided portions 711, which sandwich the guiding member 72 therebetween. The one pair of guided portions 711 are configured to regulate movement of the slider 71 in the circumferential direction of the slide driving member 70, in such a manner that the slider 71 moves in the longitudinal direction of the guiding member 72 with the rotation of the first rotary member 111.

When the slide magnet 32 supported to the slider 71 is moved downward together with the slider 71, the distance between the slide magnet 32 and the second magnetic field detecting element 62 becomes shorter, and the magnetic field strength B(Z) in the Z direction detected by the second magnetic field detecting element 62 becomes high. On the other hand, when the slide magnet 32 is moved upward together with the slider 71, the distance between the slide magnet 32 and the second magnetic field detecting element 62 becomes longer, and the magnetic field strength B(Z) in the Z direction detected by the second magnetic field detecting element 62 becomes low.

Around the meshing portion 700 of the slide driving member 70, the helical groove 700a is formed in such a manner as to be able to mesh with the slider 71 and thereby move the slide magnet 32 toward or apart from the second magnetic field detecting element 62, even when the steering wheel 10 is steered at maximum left and right steering angles.

Also, the second magnetic field detecting element 62 is disposed opposite the outer circumferential surface of the ring magnet 31, and when the ring magnet 31 is rotated, the N poles 311 and S poles 312 of the ring magnet 31 alternately face the second magnetic field detecting element 62.

The second magnetic field detecting element 62 and the slide magnet 32 are located closer to the rotational axis O than respective radial outer edges of the respective annular portions 511 and 521 of the first and second magnetic flux collecting rings 51 and 52. That is, when the torque steering angle sensor 2 is viewed in a direction parallel to the rotational axis O, the second magnetic field detecting element 62 and the slide magnet 32 are located in its inner side relative to respective outer circumferential ends of the annular portions 511 and 521. This allows for suppressing the size of the torque steering angle sensor 2 from increasing in its radial direction.

(Operation of the Torque Steering Angle Sensor)

In the torque detecting portion 2a of the torque steering angle sensor 2, a steering torque is detected by the first magnetic field detecting element 61. As shown in FIG. 4A, when no steering torque is applied to the steering shaft 11, the middle portions of the opposite pieces 411 and 421 of the first and second magnetic yokes 41 and 42 in the circumferential direction of the ring magnet 31 face the boundaries between the N poles 311 and the S poles 321, respectively, of the ring magnet 31. In this state, the magnetic field strength detected by the first magnetic field detecting element 61 is substantially zero.

On the other hand, when a steering torque is applied to the steering shaft 11, a torsion occurs in the torsion bar 113, causing a relative rotation between the ring magnet 31 and the first and second magnetic yokes 41 and 42, and the resulting shift in the locations of the opposite pieces 411 and 421 of the first and second magnetic yokes 41 and 42 in the circumferential direction of the ring magnet 31, relative to the magnetic poles (the N poles 311 and the S poles 312) of the ring magnet 31.

For example, when the ring magnet 31 is rotated through a predetermined angle (for example, 5 degrees) in the direction of arrow A in FIG. 4B relative to the first and second magnetic yokes 41 and 42, of the magnetic poles of the ring magnet 31 axially opposite the opposite pieces 411 of the first magnetic yokes 41, the N poles 311 account for a larger proportion than the S poles 312. Also, of the magnetic poles of the ring magnet 31 axially opposite the opposite pieces 421 of the second magnetic yokes 42, the S poles 312 account for a larger proportion than the N poles 311. This allows a portion of the magnetic flux exiting the N poles 311 to be passed in turn through the first magnetic yokes 41, the first magnetic flux collecting ring 51, the first magnetic field detecting element 61, the second magnetic flux collecting ring 52 and the second magnetic yokes 42, and re-enter the S poles 312.

On the other hand, when the ring magnet 31 is rotated in the opposite direction to the direction of arrow A relative to the first and second magnetic yokes 41 and 42, of the magnetic poles of the ring magnet 31 axially opposite the opposite pieces 411 of the first magnetic yokes 41, the S poles 312 account for a larger proportion than the N poles 311, while of the magnetic poles of the ring magnet 31 axially opposite the opposite pieces 421 of the second magnetic yokes 42, the N poles 311 account for a larger proportion than the S poles 312. This allows the magnetic flux to be passed through the first magnetic field detecting element 61 in the opposite direction to the above described direction.

The magnetic field strength (absolute value) detected by the first magnetic field detecting element 61 becomes higher with increasing torsion of the torsion bar 113. In this manner, the magnetic field strength detected by the first magnetic field detecting element 61 varies according to the torsion of the torsion bar 113, and the direction of that magnetic field varies according to the direction of torsion of the torsion bar 113.

The torque/steering angle computing portion 21 of the controller 20 (FIG. 1) computes the steering torque, based on an output signal indicative of the magnetic field strength detected by the first magnetic field detecting element 61.

Referring next to FIGS. 7A, 7B, 8A and 8B, operation when the steering angle is detected by the torque steering angle sensor 2 will be described.

Figure 7A:
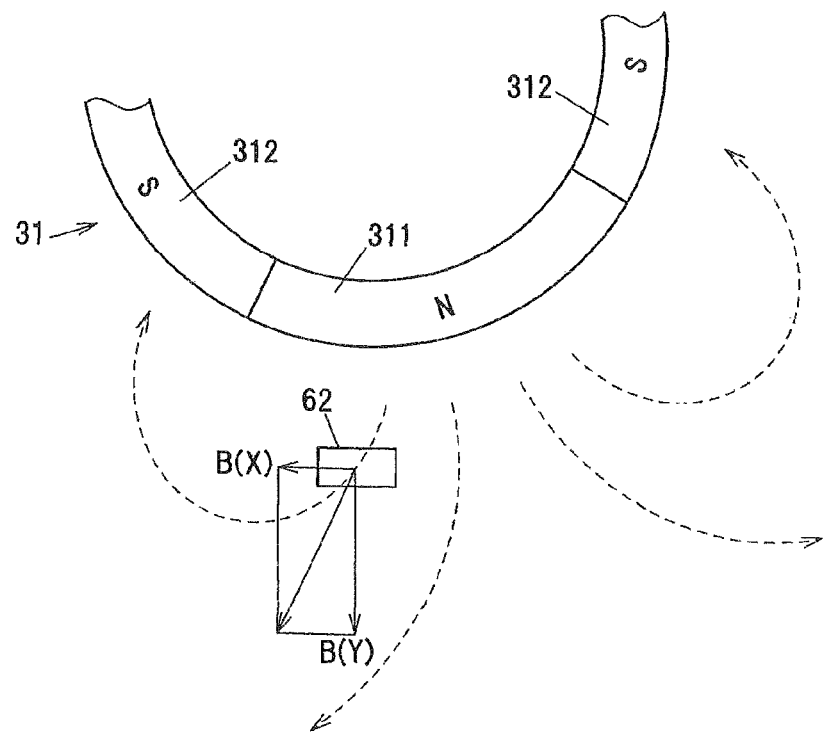
FIG. 7A is a schematic diagram showing a ring magnet and a second magnetic field detecting element when viewed from above along the rotational axis O.
Figure 7B:
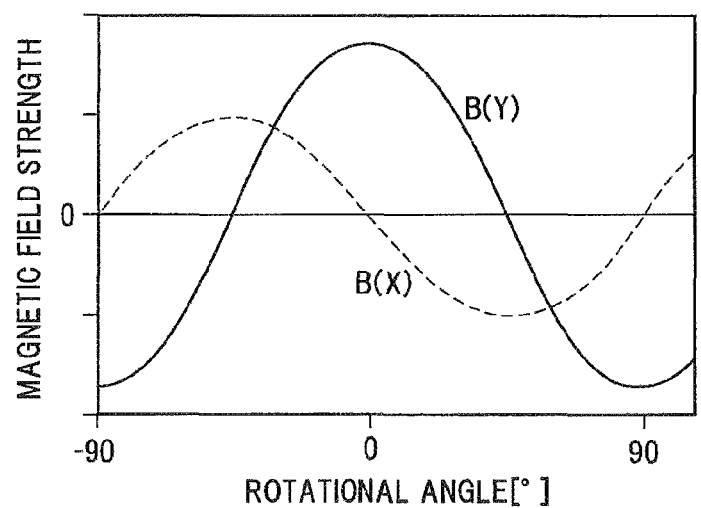
FIG. 7B is a graph showing changes in magnetic field strengths in X direction and the Y direction detected by the second magnetic field detecting element.

FIG. 7A is a schematic diagram showing the ring magnet 31 and the second magnetic field detecting element 62 when viewed from above along the rotational axis O. FIG. 7B is a graph showing changes in magnetic field strengths in the X direction and the Y direction detected by the second magnetic field detecting element 62. FIG. 7B shows the changes in the magnetic field strength B(X) in the X direction and the magnetic field strength B(Y) in the Y direction, when the first rotary member 111 is rotated through 90 degrees in one direction and in the opposite direction thereto from a reference location, where the reference location is a rotational angle (0 degrees) of the first rotary member 111 when the second magnetic field detecting element 62 is located opposite the circumferential middle of the N poles 311 of the ring magnet 31.

The magnetic field strength B(Y) in the Y direction detected by the second magnetic field detecting element 62 is a positive maximum value when the second magnetic field detecting element 62 is located opposite the circumferential middle of the N poles 311, and a negative maximum value when the second magnetic field detecting element 62 is located opposite the circumferential middle of the S poles 312. In this embodiment, since the number of magnetic poles of the ring magnet 31 is four, when the first rotary member 111 is rotated through 90 degrees, the magnetic field strength B(Y) in the Y direction detected by the second magnetic field detecting element 62 changes from the positive maximum value to the negative maximum value.

On the other hand, the magnetic field strength B(X) in the X direction detected by the second magnetic field detecting element 62 is zero when the second magnetic field detecting element 62 is located opposite the circumferential middle of the N poles 311 or the S poles 312, and a positive or negative maximum value when the magnetic pole located opposite the second magnetic field detecting element 62 changes from N pole 311 to S pole 312, or from S pole 312 to N pole 311.

In this manner, the magnetic field strength B(X) in the X direction and the magnetic field strength B(Y) in the Y direction detected by the second magnetic field detecting element 62 are out of phase as shown in FIG. 7B, and in the present embodiment, the phase difference therebetween is 45 degrees. This phase difference allows for uniquely determining the rotational angle of the first rotary member 111 in the range of ±90 degrees about the reference location, based on the combinations of the magnetic field strength B(X) in the X direction and the magnetic field strength B(Y) in the Y direction detected by the second magnetic field detecting element 62, without the combinations thereof being the same.

It should be noted, however, that, even by the detection method described above, no absolute steering angle can be determined, though it is possible to determine the change amount of the steering angle from the reference location. Therefore, in the present embodiment, the magnetic field strength B(Z) in the Z direction detected by the second magnetic field detecting element 62 is used, thereby making it possible to determine the steering angle as the absolute angle.

Figure 8A:
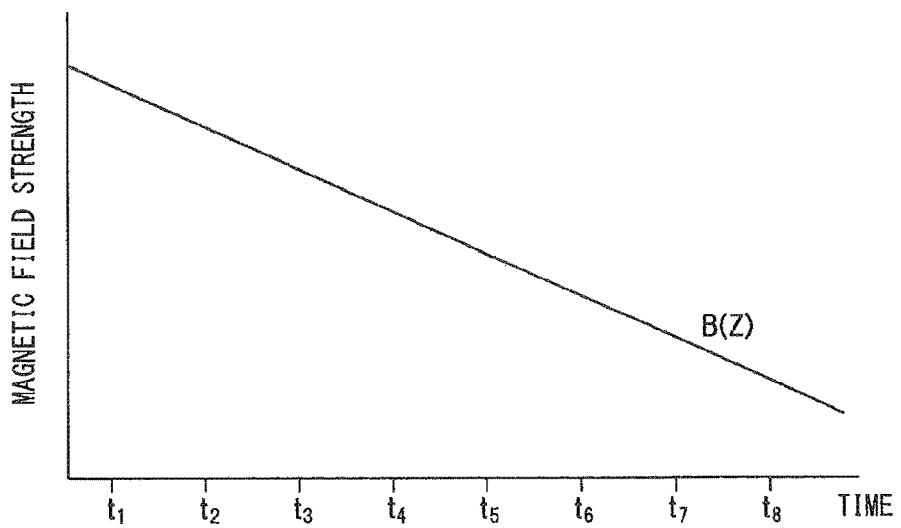
FIG. 8A is a graph showing a temporal change in magnetic field strength in a Z direction detected by the second magnetic field detecting element when a steering wheel is rotated in one direction at a constant speed.
Figure 8B:
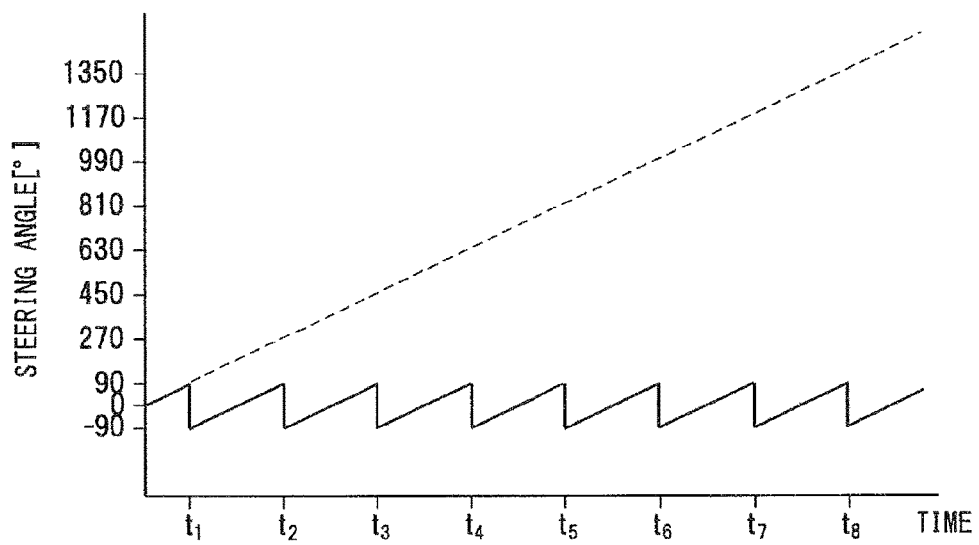
FIG. 8B is a graph showing a temporal change in the steering angle (absolute value) computed by a torque/steering angle computing portion, in the time axis common to the graph of FIG. 8A.

FIG. 8A is a graph showing a temporal change in the magnetic field strength B(Z) in the Z direction detected by the second magnetic field detecting element 62 when the steering wheel 10 is rotated in one direction at a constant speed. FIG. 8B is a graph showing a temporal change in the steering angle (absolute value) computed by the torque/steering angle computing portion 21, in the time axis common to the graph of FIG. 8A.

Since as described previously, the sliding mechanism 7 moves the slide magnet 32 in the Z direction toward or apart from the second magnetic field detecting element 62 with the rotation of the first rotary member 111, when the steering wheel 10 is rotated for example from the maximum steering angle in the leftward turning direction to the maximum steering angle in the rightward turning direction, the magnetic field strength B(Z) in the Z direction detected by the second magnetic field detecting element 62 monotonically changes substantially at a constant rate.

FIG. 8A shows, as an example, the case of a monotonic decrease in the magnetic field strength B(Z) in the Z direction detected by the second magnetic field detecting element 62 with the rotation of the steering wheel 10. Also, FIG. 8B shows the case of changes in the steering angle in the range of −90 degrees to +90 degrees obtained based on the magnetic field strengths in the X direction and the Y direction detected by the second magnetic field detecting element 62, for each time period T, where the each time period T is defined as t1-t2, t2-t3, . . . t7-t8.

The torque/steering angle computing portion 21 computes the steering angle in the range of −90 degrees to +90 degrees based on the magnetic field strengths in the X direction and the Y direction detected by the second magnetic field detecting element 62, offsets this computed steering angle based on the magnetic field strength in the Z direction detected by the second magnetic field detecting element 62, and determines the absolute value of the steering angle. That is, although the steering angle determined from the magnetic field strengths in the X direction and the Y direction detected by the second magnetic field detecting element 62 lies only in the range of ±90 degrees (180 degrees), because the magnetic field strength in the Z direction detected by the second magnetic field detecting element 62 varies in that range of ±90 degrees, adding a predetermined angle depending on the magnetic field strength in the Z direction detected by the second magnetic field detecting element 62 to the steering angle determined in that range of ±90 degrees makes it possible to determine the absolute value of the steering angle.

(Functions and Advantageous Effects of the Embodiment)

The above described embodiment has the following functions and advantageous effects.

(1) The torsion of the torsion bar 113 causes the relative rotation between the ring magnet 31 and the first and second magnetic yokes 41 and 42, and the resulting variation in the magnetic field strength detected by the first magnetic field detecting element 61, depending on the angle of the relative rotation. This therefore makes the steering torque detectable. Also, since the magnetic field strengths the second magnetic field detecting element 62 receives from the ring magnet 31 and from the slide magnet 32, respectively, are detectable, the absolute value of the steering angle can mechanically be determined by the torque/steering angle computing portion 21. Furthermore, since the slide magnet 32 produces in the second magnetic field detecting element 62 a magnetic field in a different direction from that of the magnetic field of the ring magnet 31, the absolute value of the steering angle can be determined based on the detected result of one magnetic field detecting element (i.e. the second magnetic field detecting element 62). This allows for suppressing the cost and size of the torque steering angle sensor 2 from increasing.

(2) Since the second magnetic field detecting element 62 is able to detect the magnetic field strengths in the circumferential and radial directions of the ring magnet 31, the steering angle in the range of ±90 degrees can precisely be determined by simple arithmetic operations, as described with reference to FIG. 7B.

(3) Since the sliding mechanism 7 moves the slide magnet 32 in the direction parallel to the rotational axis O of the steering shaft 11, it is possible to suppress the size of the torque steering angle sensor 2 from increasing in its radial direction around its rotational axis O.

(4) Since the sliding mechanism 7 is configured as including the slider 71 for supporting the slide magnet 32, the slide driving member 70 for meshing with the slider 71, and the guiding member 72 for guiding the slider 71 parallel to the rotational axis O, the slide magnet 32 can be moved parallel to the rotational axis O by the simple configuration.

(5) Since the ring magnet 31 is located apart from the first and second magnetic flux collecting rings 51 and 52 in the rotational axis O direction, it is possible to reduce the size of the torque steering angle sensor 2 in its radial direction, in comparison with when the first and second magnetic flux collecting rings 51 and 52 are disposed around the outer circumferential side of the ring magnet 31. Also, since the first magnetic yokes 41 and the second magnetic yokes 42 include their respective opposite pieces 411 and 421 located opposite and parallel to the axial end face of the ring magnet 31, it is possible to reduce the magnetic resistance between the ring magnet 31, and the first magnetic yokes 41 and the second magnetic yokes 42.

(6) Since the annular portions 511 and 521 of the first and second magnetic flux collecting rings 51 and 52 are in an annular plate shape whose radial width is larger than its axial thickness, it is possible to reduce the size of the torque detecting portion 2a in the axial direction. Also, since the first magnetic yokes 41 and the second magnetic yokes 42 include their respective transmitting or receiving portions 413 and 423 whose tip is in a circular arc shape having a curvature having the inner radius of the annular portions 511 and 521 of the first and second magnetic flux collecting rings 51 and 52, it is possible to narrow the gaps between the tip surfaces 413a and 423a of the transmitting or receiving portions 413 and 423 and the inner circumferential surfaces 511a and 521a of the annular portions 511 and 521, and thereby reduce the magnetic resistance between the first magnetic yokes 41, the second magnetic yokes 42, and the first and second magnetic flux collecting rings 51 and 52.

(7) Since the second magnetic field detecting element 62 and the slide magnet 32 are located closer to the rotational axis O than the respective radial outer edges of the respective annular portions 511 and 521 of the first and second magnetic flux collecting rings 51 and 52, the size of the torque steering angle sensor 2 is suppressed from increasing in its radial direction.

(8) Since the first magnetic field detecting element 61 and the second magnetic field detecting element 62 are located with the rotational axis O therebetween, the magnetic field of the slide magnet 32 arranged opposite the second magnetic field detecting element 62 is suppressed from affecting results of the magnetic field strength detected by the first magnetic field detecting element 61. The lowering in torque detection accuracy caused by the magnetic field of the slide magnet 32 is therefore avoided.

(9) Since the ring magnet 31 has the four magnetic poles, the accuracy of rotation through the steering angle is high, as compared with when the ring magnet 31 has two magnetic poles. That is, since the magnetic field strengths in X direction and the Y direction detected by the second magnetic field detecting elements 62 change from a positive maximum value to a negative maximum value in the narrow angle range in comparison to when the number of magnetic poles is two, it is possible to increase the resolution of the steering angle. Incidentally, the number of magnetic poles of the ring magnet 31 is not limited to four, but may be, for example six or eight, and having not smaller than four magnetic poles of the ring magnet 31 allows for determining the steering angle with a high accuracy.

Second Embodiment

Next, a second embodiment of the present invention will be described with reference to FIGS. 9A to 9C. A torque steering angle sensor of the present embodiment is configured in the same manner as the torque steering angle sensor 2 in the first embodiment, except that a torque detecting portion 2a' is configured in a different manner from the torque detecting portion 2a. Therefore, that torque detecting portion 2a' different from the torque detecting portion 2a will be described in detail.

Figure 9A:
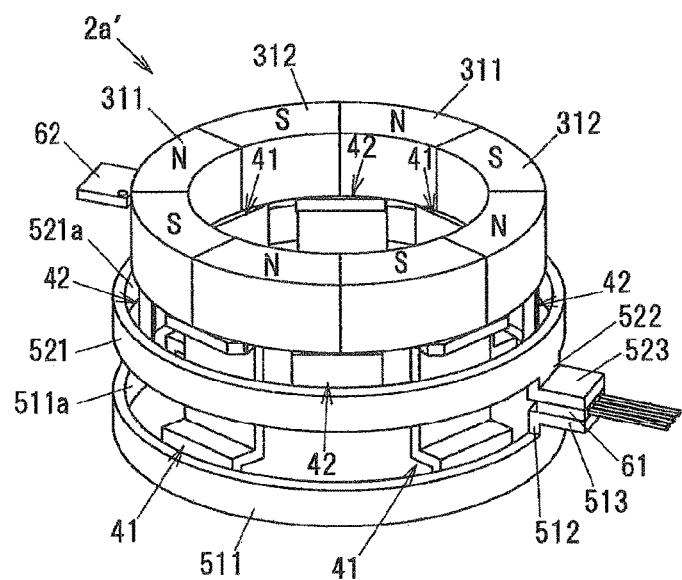
FIG. 9A is a perspective view showing a configuration of a torque detecting portion of a torque steering angle sensor in a second embodiment together with a second magnetic field detecting element.
Figure 9B:
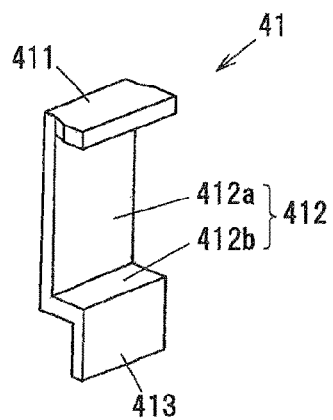
FIG. 9B is a perspective view showing a first magnetic yoke.
Figure 9C:
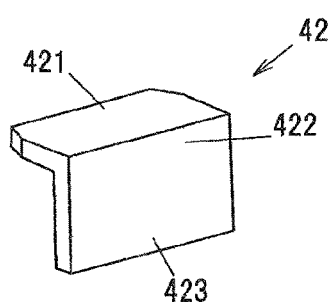
FIG. 9C is a perspective view showing a second magnetic yoke.

FIG. 9A is a perspective view showing a configuration of the torque detecting portion 2a' of the torque steering angle sensor of the second embodiment, together with a second magnetic field detecting element 62. FIG. 9B is a perspective view showing a first magnetic yoke 41 constituting the torque detecting portion 2a'. FIG. 9C is a perspective view showing a second magnetic yoke 42 constituting the torque detecting portion 2a'.

Although in the first embodiment, it has been described that the four magnetic poles composed of the two N poles 311 and the two S poles 312 are formed around the ring magnet 31, in the second embodiment are formed eight poles composed of four N poles 311 and four S poles 312 around a ring magnet 31.

Also, although in the first embodiment, it has been described that the torque detecting portion 2a has the two first magnetic yokes 41 and the two second magnetic yokes 42, the torque detecting portion 2a' in the second embodiment has the four first magnetic yokes 41 and the four second magnetic yokes 42. The first magnetic yokes 41 and the second magnetic yokes 42 are held in a holding member not shown made of a resin.

Furthermore, although in the first embodiment, the annular portions 511 and 521 of the first and second magnetic flux collecting rings 51 and 52 are in an annular plate shape whose radial width is larger than its axial thickness, the annular portions 511 and 521 of the first and second magnetic flux collecting rings 51 and 52 in the second embodiment are in a circular cylindrical shape whose axial width is larger than its radial thickness. The first magnetic field detecting element 61 is located opposite and between the opposite portion 513 of the first magnetic flux collecting ring 51 and the opposite portion 523 of the second magnetic flux collecting ring 52.

On the first magnetic flux collecting ring 51, the connecting portion 512, which connects the annular portion 511 and the opposite portion 513 together, is extended upward at an upper end of the annular portion 511, and the opposite portion 513 is extended to an outer side of the annular portion 511 at an upper end of the connecting portion 512. Also, on the second magnetic flux collecting ring 52, the connecting portion 522, which connects the annular portion 521 and the opposite portion 523 together, is extended downward at a lower end of the annular portion 521, and the opposite portion 523 is extended to an outer side of the annular portion 521 at a lower end of the connecting portion 522. The annular portions 511 and 521 of the first and second magnetic flux collecting rings 51 and 52 are arranged coaxially with the ring magnet 31.

The first magnetic yokes 41 each include a respective opposite piece 411, which is located opposite and parallel to an axial end face at the corresponding N pole 311 of the ring magnet 31, a respective transmitting or receiving portion 413 to transmit or receive the magnetic flux to or from the annular portion 511 of the first magnetic flux collecting ring 51, and a respective transferring portion 412 to transfer the magnetic flux between the respective opposite piece 411 and the respective transmitting or receiving portion 413. The respective transferring portion 412 is composed of an axial transferring portion 412a, which is arranged parallel to the rotational axis O, and a radial transferring portion 412b, which is extended in a radial direction toward the annular portion 511 of the first magnetic flux collecting ring 51 at a lower end of the axial transferring portion 412a. The respective transmitting or receiving portion 413 is in a plate shape radially opposite an inner circumferential surface 511a of the annular portion 511 of the first magnetic flux collecting ring 51.

The second magnetic yokes 42 each include a respective opposite piece 421, which is located opposite and parallel to an axial end face at the corresponding S pole 312 of the ring magnet 31, a respective transmitting or receiving portion 423 to transmit or receive the magnetic flux to or from the annular portion 521 of the second magnetic flux collecting ring 52, and a respective transferring portion 422 to transfer the magnetic flux between the respective opposite piece 421 and the respective transmitting or receiving portion 423. The respective transferring portion 422 and the respective transmitting or receiving portion 423 are formed of a single flat plate, and the respective transmitting or receiving portion 423 is located opposite the inner circumferential surface 521a of the annular portion 521 of the second magnetic flux collecting ring 52, while the respective transferring portion 422 is located at the ring magnet 31 side relative to the transmitting or receiving portion 423. In other words, the transmitting or receiving portion 423 is in a plate shape radially opposite an inner circumferential surface 521a of the annular portion 521 of the second magnetic flux collecting ring 52.

The torque steering angle sensor in the second embodiment operates in the same manner as described in the first embodiment.

Even the second embodiment has the same functions and advantageous effects as the functions and advantageous effects described in the first embodiment. In addition, since the ring magnet 31 has the eight poles, the accuracy of detection of the steering torque and the steering angle is enhanced.

(Summary of the Embodiment)

Next, the technical concept that is ascertained from the embodiment described above will be described with the aid of the reference characters and the like in the embodiment. It should be noted, however, that each of the reference characters in the following description should not be construed as limiting the constituent elements in the claims to the members and the like specifically shown in the embodiment.

[1] A torque steering angle sensor (2), which is arranged on a coupling portion for a first rotary member (111) and a second rotary member (112) of an electrically assisted power steering device (1) to be coupled together by a torsion bar (113) having a torsional angle depending on a steering torque of a steering wheel (10), and which is configured to detect a steering angle and the steering torque of the steering wheel (10), comprising: an annular ring magnet (31) provided with a plurality of magnetic poles (N poles 311 and S poles 312) having different polarities in a circumferential direction around a rotational axis (O) of the first rotary member (111) and the second rotary member (112), the annular ring magnet (31) being configured to rotate together with the first rotary member (111); a plurality of magnetic path forming members (first magnetic yokes 41 and second magnetic yokes 42) to form magnetic paths for a magnetic flux of the ring magnet (31), the magnetic path forming members (first magnetic yokes 41 and second magnetic yokes 42) being configured to vary in location relative to the plurality of magnetic poles (N poles 311 and S poles 312) of the ring magnet (31), depending on torsion of the torsion bar (113); one pair of magnetic flux collecting rings (51 and 52) to collect the magnetic flux of the plurality of magnetic path forming members (first magnetic yokes 41 and second magnetic yokes 42); a first magnetic field detecting element (61) to detect a magnetic field strength between the one pair of magnetic flux collecting rings (51 and 52); a non-rotary member (82) for being not rotated by rotation of the first rotating member; a second magnetic field detecting element (62) fixed to the non-rotary member (82), and located in such a manner as to receive a magnetic field from the ring magnet (31); a slide magnet (32) for producing a magnetic field in a different direction from that of the magnetic field of the ring magnet (31) in the second magnetic field detecting element (62); and a sliding mechanism (7) to move the slide magnet (32) toward or apart from the second magnetic field detecting element (62) with the rotation of the first rotary member (111), wherein the second magnetic field detecting element (62) is configured to be able to detect a magnetic field strength received from the ring magnet (31), and a magnetic field strength received from the slide magnet (32).

[2] The torque steering angle sensor (2) according to [1] above, wherein the second magnetic field detecting element (62) is disposed opposite an outer circumferential surface of the ring magnet (31), so as to be able to detect magnetic field strengths in circumferential and radial directions of the ring magnet (31).

[3] The torque steering angle sensor (2) according to [1] or [2] above, wherein the sliding mechanism (7) is configured to move the slide magnet (32) parallel to the rotational axis (O).

[4] The torque steering angle sensor (2) according to [3] above, wherein the sliding mechanism (7) includes: a supporting member (71) for supporting the slide magnet (32); an annular member (slide driving member 70) configured to rotate together with the first rotary member (111), and including a helical meshing portion (700) formed around an outer circumferential surface in such a manner as to mesh with the supporting member (71); and a guiding member (72) fixed to the non-rotary member (82) so as to guide the supporting member (71) parallel to the rotational axis (0).

[5] The torque steering angle sensor (2) according to any one of [1] to [4] above, wherein the ring magnet (31) is located apart from the one pair of magnetic flux collecting rings (51 and 52) in a rotational axis (O) direction, and the plurality of magnetic path forming members (first magnetic yokes 41 and second magnetic yokes 42) each include a respective opposite piece (411, 421), which is located opposite and parallel to an axial end face of the ring magnet (31), a respective transmitting or receiving portion (413, 423) to transmit or receive the magnetic flux to or from one of the one pair of magnetic flux collecting rings (51 and 52), and a respective transferring portion (412, 422) to transfer the magnetic flux between the respective opposite piece (411, 421) and the respective transmitting or receiving portion (413, 423).

[6] The torque steering angle sensor (2) according to [5] above, wherein the one pair of magnetic flux collecting rings (51 and 52) each include a respective annular portion (511, 521), which is disposed coaxially with the ring magnet (31) to transmit or receive the magnetic flux to or from the respective transmitting or receiving portions (413, 423) of the magnetic path forming members (first magnetic yokes 41 and second magnetic yokes 42), and a respective opposite portion (513, 523), which is located opposite the first magnetic field detecting element (61), wherein the annular portions (511, 521) are in an annular plate shape whose radial width is larger than its axial thickness, wherein the transmitting or receiving portions (413, 423) include a tip formed in a circular arc shape having a curvature having an inner radius of the annular portions (511, 521), extend in a radial direction of the annular portions (511, 521), and are in a plate shape having a thickness in an axial direction of the annular portions (511, 521).

[7] The torque steering angle sensor (2) according to [5] above, wherein the one pair of magnetic flux collecting rings (51 and 52) each include a respective annular portion (511, 521), which is disposed coaxially with the ring magnet (31) to transmit or receive the magnetic flux to or from the respective transmitting or receiving portions (413, 423) of the magnetic path forming members (first magnetic yokes 41 and second magnetic yokes 42), and a respective opposite portion (513, 523), which is located opposite the first magnetic field detecting element (61), wherein the annular portions (511, 521) are in a circular cylindrical shape whose axial width is larger than its radial thickness, wherein the transmitting or receiving portions (413, 423) are in a plate shape radially opposite respective inner circumferential surfaces (511a, 521a) of the annular portions (511, 521).

[8] The torque steering angle sensor (2) according to [6] above, wherein the second magnetic field detecting element (62) and the slide magnet (32) are located closer to the rotational axis (O) than respective radial outer edges of the respective annular portions (511, 521) of the one pair of magnetic flux collecting rings (51 and 52).

[9] The torque steering angle sensor (2) according to any one of [1] to [8] above, wherein the first magnetic field detecting element (61) and the second magnetic field detecting element (62) are located with the rotational axis (O) therebetween.

[10] The torque steering angle sensor (2) according to any one of [1] to [9] above, wherein the ring magnet (31) includes 4 or more magnetic poles (N poles 311 and S poles 312).

Although the embodiment of the present invention has been described above, the embodiment described above should not be construed as limiting the invention in the appended claims. It should also be noted that not all the combinations of the features described in the above embodiment are essential to the means for solving the problems of the invention.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A torque steering angle sensor, which is arranged on a coupling portion for a first rotary member and a second rotary member of an electrically assisted power steering device to be coupled together by a torsion bar having a torsional angle depending on a steering torque of a steering wheel, and which is configured to detect a steering angle and the steering torque of the steering wheel, comprising:
    an annular ring magnet provided with a plurality of magnetic poles having different polarities in a circumferential direction around a rotational axis of the first rotary member and the second rotary member, the annular ring magnet being configured to rotate together with the first rotary member;
    a plurality of magnetic path forming members to form magnetic paths for a magnetic flux of the ring magnet, the magnetic path forming members being configured to vary in location relative to the plurality of magnetic poles of the ring magnet, depending on torsion of the torsion bar;
    one pair of magnetic flux collecting rings to collect the magnetic flux of the plurality of magnetic path forming members;
    a first magnetic field detecting element to detect a magnetic field strength between the one pair of magnetic flux collecting rings;
    a non-rotary member for being not rotated by rotation of the first rotary member;
    a second magnetic field detecting element fixed to the non-rotary member, and located in such a manner as to receive a magnetic field from the ring magnet;
    a slide magnet for producing a magnetic field in a different direction from that of the magnetic field of the ring magnet in the second magnetic field detecting element; and
    a sliding mechanism to move the slide magnet toward or apart from the second magnetic field detecting element with the rotation of the first rotary member,
    wherein the second magnetic field detecting element is configured to be able to detect a magnetic field strength received from the ring magnet, and a magnetic field strength received from the slide magnet.

2. The torque steering angle sensor according to claim 1, wherein the second magnetic field detecting element is disposed opposite an outer circumferential surface of the ring magnet, so as to be able to detect magnetic field strengths in circumferential and radial directions of the ring magnet.

3. The torque steering angle sensor according to claim 1, wherein the sliding mechanism is configured to move the slide magnet parallel to the rotational axis.

4. The torque steering angle sensor according to claim 3, wherein the sliding mechanism includes:
    a supporting member for supporting the slide magnet;
    an annular member configured to rotate together with the first rotary member, and including a helical meshing portion formed around an outer circumferential surface in such a manner as to mesh with the supporting member; and
    a guiding member fixed to the non-rotary member so as to guide the supporting member parallel to the rotational axis.

5. The torque steering angle sensor according to claim 1, wherein the ring magnet is located apart from the one pair of magnetic flux collecting rings in a rotational axis direction, and
    the plurality of magnetic path forming members each include a respective opposite piece, which is located opposite and parallel to an axial end face of the ring magnet, a respective transmitting or receiving portion to transmit or receive the magnetic flux to or from one of the one pair of magnetic flux collecting rings, and a respective transferring portion to transfer the magnetic flux between the respective opposite piece and the respective transmitting or receiving portion.

6. The torque steering angle sensor according to claim 5, wherein the one pair of magnetic flux collecting rings each include a respective annular portion, which is disposed coaxially with the ring magnet to transmit or receive the magnetic flux to or from the respective transmitting or receiving portions of the magnetic path forming members, and a respective opposite portion, which is located opposite the first magnetic field detecting element,
    wherein the annular portions are in an annular plate shape whose radial width is larger than its axial thickness,
    wherein the transmitting or receiving portions include a tip formed in a circular arc shape having a curvature having an inner radius of the annular portions, extend in a radial direction of the annular portions, and are in a plate shape having a thickness in an axial direction of the annular portions.

7. The torque steering angle sensor according to claim 5, wherein the one pair of magnetic flux collecting rings each include a respective annular portion, which is disposed coaxially with the ring magnet to transmit or receive the magnetic flux to or from the respective transmitting or receiving portions of the magnetic path forming members, and a respective opposite portion, which is located opposite the first magnetic field detecting element,
    wherein the annular portions are in a circular cylindrical shape whose axial width is larger than its radial thickness, wherein the transmitting or receiving portions are in a plate shape radially opposite respective inner circumferential surfaces of the annular portions.

8. The torque steering angle sensor according to claim 6, wherein the second magnetic field detecting element and the slide magnet are located closer to the rotational axis than respective radial outer edges of the respective annular portions of the one pair of magnetic flux collecting rings.

9. The torque steering angle sensor according to claim 1, wherein the first magnetic field detecting element and the second magnetic field detecting element are located with the rotational axis therebetween.

10. The torque steering angle sensor according to claim 1, wherein the ring magnet includes 4 or more magnetic poles.

* * * * *